May 31, 1927.

F. MORTENSEN

SPEED INDICATOR

Filed July 13, 1926

Inventor
Frantz Mortensen
By Munn &Co
Attorneys

Patented May 31, 1927.

1,630,963

UNITED STATES PATENT OFFICE.

FRANTZ MORTENSEN, OF HELSINGFORS, FINLAND.

SPEED INDICATOR.

Application filed July 13, 1926, Serial No. 122,250, and in Germany July 17, 1925.

The use of speed indicators, giving a sound for each revolution of a revolving shaft until a certain speed is attained, is already known. In the construction of such speed indicators however the member creating the sound is generally lifted by the rotation of the shaft and drops in a certain position irrespective of the speed of the shaft thereby creating a certain constant and disagreeable sound.

The present invention refers to a speed indicator in which the member (for instance a steel ball) moves in a closed channel which is bent around the shaft to be controlled and which revolves with the shaft. On account of this bent channel the effect of the centrifugal force is eliminated, the member (i. e. the ball) will only leave the channel when the speed is below a certain limit and the sound otherwise created by the fall of the ball will be eliminated.

The drawing shows an example of a speed indicator in accordance with the present construction.

The arrangement consists principally of a revolving shaft $a$ on which a bushing $c$ is fixed. In connection with the cover $d$ this bushing forms a channel $g$ which is closed in one end by means of a stopper $i$ whereas the other end is open so that the ball may slide out of the channel and strike against the bell $b$. The bell is fixed to the shaft by means of a screw $f$.

The speed indicator works as follows:—

Figure 2:
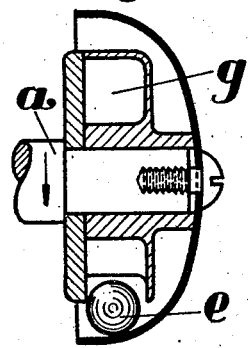
Figure 2 shows the same section but with the ball in a different position.
Figure 4:
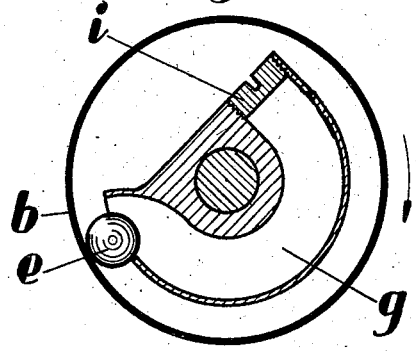
Figure 6:
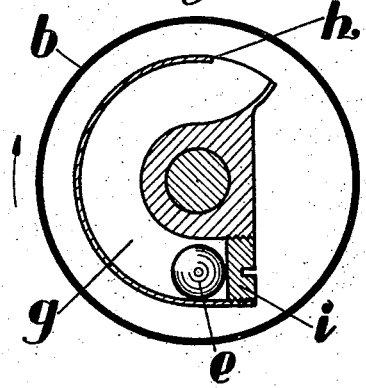
Figures 5 and 6 shows the indicator turned in different positions.
Figure 5:
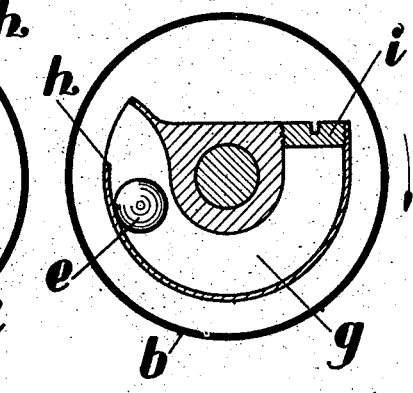

As long time as the speed is below a certain limit the ball or the member when sliding in the channel will leave the channel on account of the comparatively low speed and strike against the bell as shown in Figures 2 and 4. As soon as the speed limit is attained or exceeded the member will not leave the channel and consequently the sound will cease.

Figure 1:
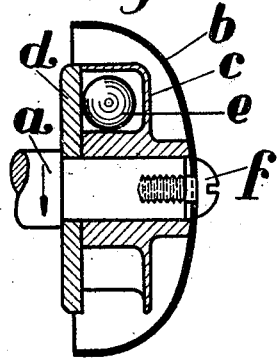
Figure 1 shows a section through the speed indicator.
Figure 3:
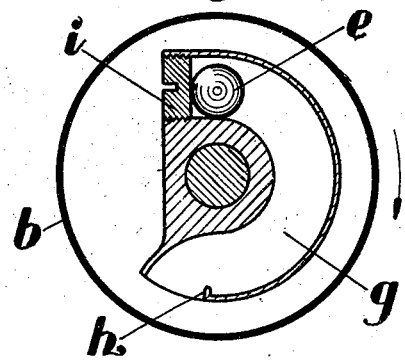
Figures 3 and 4 show vertical sections of, respectively, Figure 1 and Figure 2.

The limit at which the member will cease to strike against the bell may be varied considerably either by altering the height of the edge $h$ shown in Figure 3 or by altering the radius or the shape of the channel or by adjusting the screw $i$.

Claims.

1. An indicator for indicating the speed of a revolving shaft characterized thereby that a channel in which a member for instance a ball moves when the shaft revolves, is bent round the shaft to be controlled and revolves with the shaft, and a resonant body in the path of the ball, whereby the ball will strike against the resonant body and create a sound for each revolution of the shaft until a certain speed is attained.

2. In a speed indicator for a revolving shaft the combination with a shaft, of a member fixedly secured to the shaft and having a curved channel of even diameter throughout and of a length to extend more than one half around the shaft, said channel being open at one end, a ball in the channel, and a bell secured to the shaft and disposed in the path of the ball.

FRANTZ MORTENSEN.